(12) United States Patent
Mathissen et al.

(10) Patent No.: US 10,259,388 B2
(45) Date of Patent: Apr. 16, 2019

(54) VEHICLE AND METHOD FOR ILLUMINATING A PASSENGER COMPARTMENT OF A VEHICLE WITH DISTRIBUTED AMBIENT LIGHTS

(71) Applicant: Ford Global Technologies, LLC, Dearborn, MI (US)

(72) Inventors: Marcel Mathissen, Wurselen (DE); Thomas Baranowski, Wurselen (DE); Maximilian Julius Engelke, Aachen (DE); Maik Broda, Wurselen (DE); Xiao Chen, Meerbusch (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/788,150

(22) Filed: Oct. 19, 2017

(65) Prior Publication Data
US 2018/0111549 A1 Apr. 26, 2018

(30) Foreign Application Priority Data
Oct. 25, 2016 (DE) .......................... 10 2016 220 931

(51) Int. Cl.
*B60H 1/00* (2006.01)
*B60Q 3/20* (2017.01)
(Continued)

(52) U.S. Cl.
CPC ........... *B60Q 3/78* (2017.02); *B60H 1/00985* (2013.01); *B60K 35/00* (2013.01); *B60K 37/02* (2013.01);
(Continued)

(58) Field of Classification Search
CPC ..... B60Q 2500/20; B60Q 3/208; B60Q 3/233; B60Q 3/283; B60Q 3/78
See application file for complete search history.

(56) References Cited

U.S. PATENT DOCUMENTS

| | | | |
|---|---|---|---|
| 7,344,277 | B2 | 3/2008 | Anderson, Jr. et al. |
| 8,786,418 | B2 | 7/2014 | Lucas |
| (Continued) | | | |

FOREIGN PATENT DOCUMENTS

| | | |
|---|---|---|
| DE | 102006036060 A1 | 2/2008 |
| DE | 102008064022 A1 | 9/2009 |
| (Continued) | | |

*Primary Examiner* — Omeed Alizada
(74) *Attorney, Agent, or Firm* — Vichit Chea; Price Heneveld LLP

(57) ABSTRACT

A method for illuminating a passenger compartment of a vehicle with lighting devices which each contain one or more diffuse and/or indirect light sources. The intensity and color of the light emitted by the light sources being set automatically as a function of specific operating parameters which are influenced by a vehicle occupant. The lighting devices which are respectively spatially assigned to an area of the passenger compartment of the vehicle in which there is a vehicle component with an operating parameter which can be set separately by the driver and which can act on a general operating mode selected by the driver, are actuated in such a way that their intensity and color indicate to the driver whether the current setting of the separately settable operating parameter has a positive or negative effect on the general operating mode selected by the driver.

4 Claims, 2 Drawing Sheets

(51) Int. Cl.
*B60Q 3/78* (2017.01)
*B60Q 3/80* (2017.01)
*B60Q 9/00* (2006.01)
*B60K 35/00* (2006.01)
*B60K 37/02* (2006.01)
*B60Q 3/208* (2017.01)
*B60Q 3/233* (2017.01)
*B60Q 3/283* (2017.01)

(52) U.S. Cl.
CPC ............... *B60Q 3/20* (2017.02); *B60Q 3/208* (2017.02); *B60Q 3/233* (2017.02); *B60Q 3/283* (2017.02); *B60Q 3/80* (2017.02); *B60Q 9/00* (2013.01); *B60Q 2500/20* (2013.01)

(56) References Cited

U.S. PATENT DOCUMENTS

| | | |
|---|---|---|
| 2003/0142504 A1 | 7/2003 | Mueller et al. |
| 2011/0084852 A1 | 4/2011 | Szczerba |
| 2011/0178670 A1* | 7/2011 | Perkins .................. B60K 35/00 701/31.4 |
| 2014/0077942 A1 | 3/2014 | Jayamohan et al. |

FOREIGN PATENT DOCUMENTS

| | | |
|---|---|---|
| DE | 102009056657 A1 | 6/2011 |
| DE | 102010020566 A1 | 11/2011 |
| DE | 102011013777 A1 | 11/2011 |
| DE | 102014017337 A1 | 6/2015 |
| DE | 102015006425 A1 | 11/2016 |
| EP | 1259400 B1 | 1/2001 |

* cited by examiner

VEHICLE AND METHOD FOR ILLUMINATING A PASSENGER COMPARTMENT OF A VEHICLE WITH DISTRIBUTED AMBIENT LIGHTS

FIELD OF THE INVENTION

The present invention generally relates to a method for illuminating a passenger compartment of a vehicle generally with ambient lighting devices, which are respectively spatially assigned to a specific area of the passenger compartment of the vehicle.

BACKGROUND OF THE INVENTION

A method of illuminating a passenger compartment of a vehicle is disclosed in EP 1 259 400 B1 and serves to compensate for deviations of an actual value such as of an actual passenger compartment temperature from a target value predefined by a vehicle occupant, such as a target passenger compartment temperature, by using suitable coloring in such a way that the deviations are felt to be less unpleasant by vehicle occupants, and the well-being of the occupants is improved. Other psychological effects can also be brought about, e.g., by setting colors which have a concentration-enhancing or calming effect.

DE 10 2006 036 060 A1 discloses a lighting system for a passenger compartment of a vehicle, which lighting system selects and sets one of a variety of stored lighting scenarios as a function of sensors signals that describe the state of the vehicle or the driving mode. In this context, e.g., blue passenger compartment lighting is set if the external temperature is high, and red passenger compartment lighting is set if the external temperature is low.

DE 10 2011 013 777 A1 discloses a lighting system for a passenger compartment of a vehicle, wherein acquired measurement data is evaluated and the colors of the light of distributed lighting which form ambient lighting is set separately as a function of the evaluation. For example, vehicle data such as the rotational speed, acceleration, etc., are converted into light signals which reflect the state of the vehicle.

There are also motor vehicles which use ambient lighting to display certain general operating modes of the vehicle such as an energy saving mode or a sporty mode for sporty driving. U.S. Pat. No. 8,786,418 B2 discloses indicating changes in fuel consumption, current consumption or recharging of the battery by changing the color of interior lighting.

If the driver has selected a general operating mode of the abovementioned type, he can detect on the basis of the feedback via the lighting, for example, he is driving in a fuel-saving fashion or not. The fuel consumption depends, however, on a multiplicity of operating parameters, and the driver cannot recognize solely from the lighting whether he can possibly do something in order to drive in a more fuel-saving fashion. Although the driver could be provided with corresponding messages by text or voice, drivers may often feel disturbed by a large number of such messages.

It would be desirable to further develop the known method for illuminating a passenger compartment of a vehicle by means of distributed lighting devices to the effect that the driver is helped in a comfortable way to achieve a more optimum way a general operating state which is desired by the driver.

SUMMARY OF THE INVENTION

According to one aspect of the present invention, a method for illuminating a passenger compartment of a vehicle is provided. The method includes automatically setting intensity and color of light emitted by lighting devices as a function of specific operating parameters which are influenced by a vehicle occupant, wherein the lighting devices which are respectively spatially assigned to an area of the passenger compartment of the vehicle in which there is a vehicle component with an operating parameter which can be set separately by the driver and which can act on a general operating mode selected by the driver. The lighting devices are actuated such that the intensity and color indicate to the driver whether the current setting of the separately settable operating parameter has a positive or negative effect on the general operating mode selected by the driver.

According to another aspect of the present invention, a method for illuminating a passenger compartment of a vehicle. The method includes the steps of receiving a general operating mode, receiving specific operating parameters, and actuating lighting devices in areas of the passenger compartment where there is a vehicle component with an operating parameter so that intensity and color of the lighting devices indicate whether a current setting of an operating parameter has a positive or negative effect on the general operating mode.

According to a further aspect of the present invention, a motor vehicle is provided. The motor vehicle includes a plurality of passenger compartment lighting devices, and an operating parameter input for receiving one or more operating parameters. The motor vehicle also includes a general operating mode input for receiving a general operating mode, and a control unit actuating the lighting devices so that intensity and color indicate whether the current setting of the separately settable operating parameter has a positive or negative effect on the general operating mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
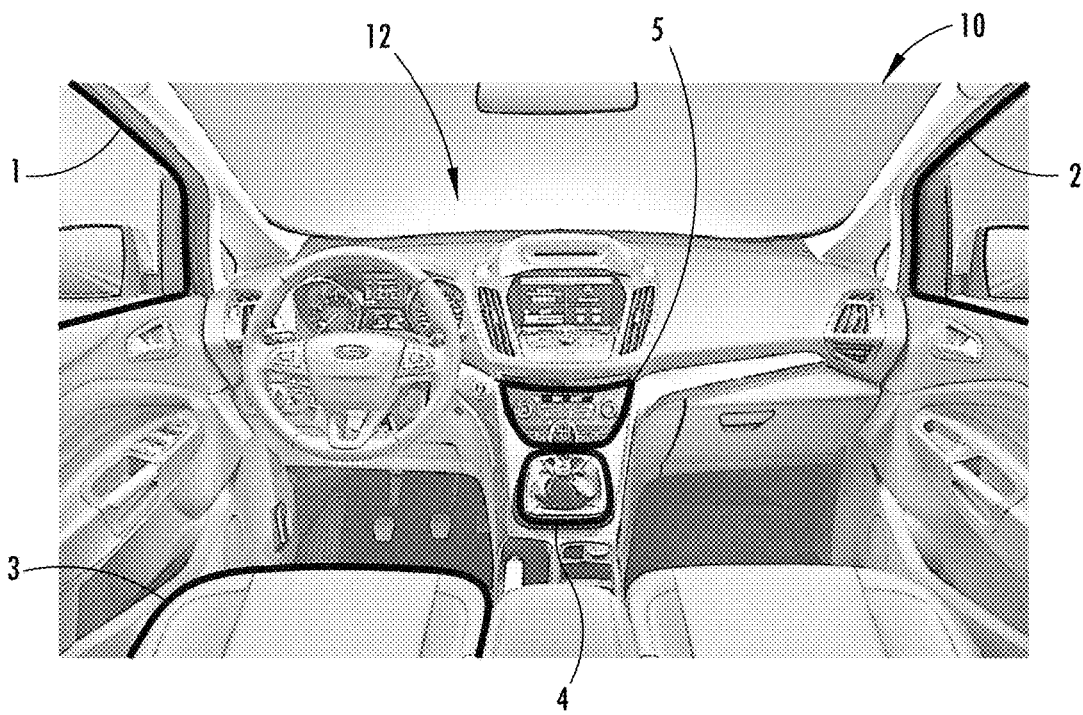
FIG. 1 is a perspective view of a passenger compartment of a vehicle equipped with ambient lights for illuminating the passenger compartment, according to one embodiment.

Referring to FIG. 1, a detailed configuration of the passenger compartment 12 of a vehicle 10 is illustrated which can be seen in schematic form, according to one example. Each of the areas which are represented by bold black lines includes areas where ambient lighting is located.

In this example, a first diffusively emitting ambient lighting device 1 extends along a line around the left-hand front side window, a second diffusively emitting ambient lighting device 2 extends along a line around the right-hand side front side window, a third diffusively emitting ambient lighting device 3 extends along a line partially around the driver's seat, a fourth diffusively emitting ambient lighting device 4 extends along a line around a gear speed selector, and a fifth diffusively emitting ambient lighting device 5 extends along a line around an air conditioning control console. Each of lighting devices 1-5 may be ambient lighting devices that generate ambient lights.

Other ambient lighting devices may also be present which are likewise respectively spatially assigned to an area of the passenger compartment 12 of the vehicle 10 in which there is a vehicle component with an operating parameter which can be set separately by the driver and which can act on a general operating mode which is selected by the driver and which is aimed at a specific general type of driving, such as for example an energy saving mode or fuel saving mode, a sporty mode for sporty driving, an air quality mode for good air quality in the passenger compartment of the vehicle, an air conditioning mode for the highest possible effectiveness of the air conditioning system or the like.

In one example which matches the arrangement shown in FIG. 1, the driver has selected the fuel saving mode, and the external temperature is low. The left-hand side window is open and should be closed in the fuel saving mode, at any rate in the current parameter situation (speed, external temperature, etc.). Correspondingly, the first ambient lighting device 1 generates a red color light. At other speeds and external temperatures, the first ambient lighting device 1 may generate a green color light because it is then possibly more appropriate to open a window than to use the air conditioning system.

Further, in this example, the right-hand side window is open, as normally desired in the fuel saving mode. Correspondingly, the second ambient lighting device 2 generates a green color light. The seat heating system is operating and the driver would consume less energy if it was switched off. Correspondingly, the third ambient lighting device 3 generates a red color light. An excessively low gear speed is selected and a higher gear speed would save fuel. Correspondingly, the fourth ambient lighting device 4 generates a red color light. The air conditioning system is switched off and is therefore not consuming any energy. Correspondingly, the fifth ambient lighting device 5 generates a green color light.

The intensity and color of each local lighting device 1-5 can also be selected as a function of the extent to which the associated operating parameter makes a positive or negative contribution to the objective of the selected general operating state.

This is described in more detail using the example of an energy saving mode. Instead of displaying to the user only a single operating parameter such as, for example, the fuel consumption by color variation and/or brightness variation of ambient lighting, a plurality of operating parameters are used to form a general operating mode index. In this example, an energy saving mode index is used to actuate the ambient lighting.

The input operating parameters which are used may be standardized to 1 and can additionally each be weighted with a weighting factor (multiplied) which specifies the proportional influence of the respective operating parameter on the fuel consumption, that is to say is a measure of the degree to which the optimum of the selected general operating mode is achieved at a particular time.

The energy saving mode index is then most easily formed as a sum of the products of all the operating parameters used and of the associated weighting factors divided by the sum of the weighting factors.

A number of examples of input operating parameters in the example scenario "energy saving mode" may include the vehicle velocity, tire pressure, engine speed, engaged gear speed, window closed states, air conditioning on or off, air throughput rate of the ventilation system, weight of the vehicle, external lighting of the vehicle on or off, seat heating system on or off, steering wheel heating system on or off, acceleration behavior or deceleration behavior averaged over time, etc.

If input operating parameters are spatially assigned to specific areas of the passenger compartment of the vehicle, the driver's attention can be drawn to the corresponding spatial area in the way described above with reference to FIG. 1.

Input operating parameters with currently valid or invalid values, for which there is no such direct spatial assignment, can be indicated, for example, by means of ambient lighting which surrounds a display on the dashboard on which corresponding messages are provided using text or graphics, or which is visually highlighted in some other way.

Figure 2:
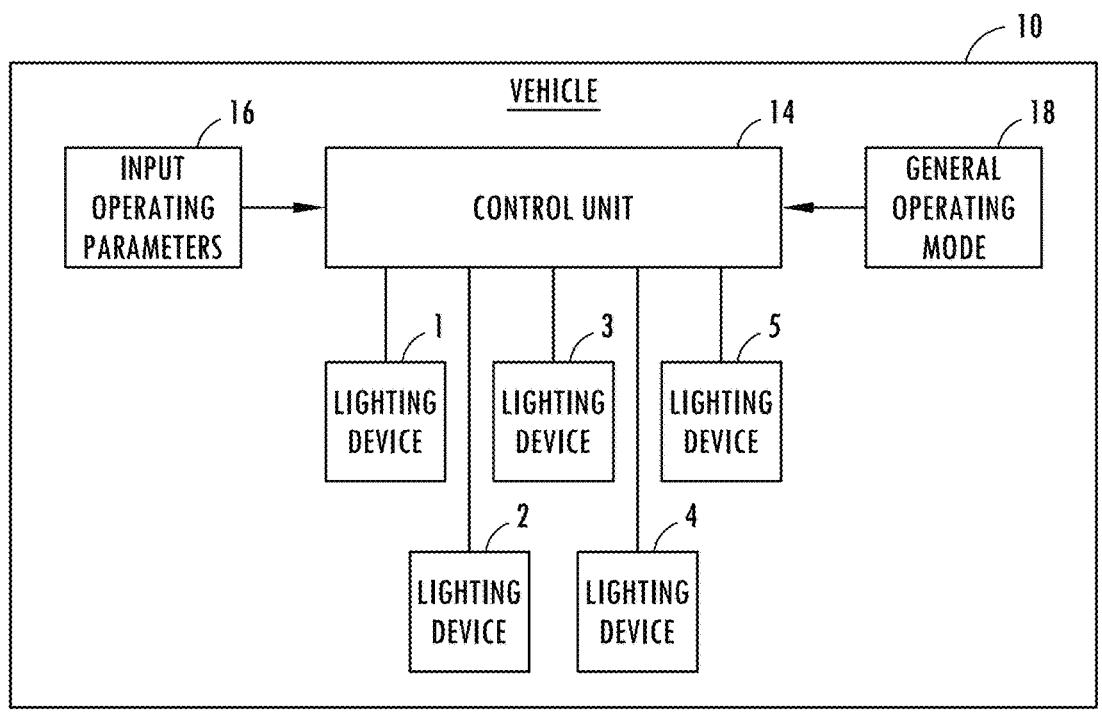
FIG. 2 is a block diagram further illustrating the vehicle and the control of the light illumination.

The control arrangement for controlling the ambient lighting devices 1-5 on vehicle 10 is further illustrated in FIG. 2, according to one embodiment. The vehicle 10 includes a control unit 14 which may include analog circuitry and/or digital circuitry, such as a processor, for example, a microprocessor. Control unit 14 may be a shared controller that shares processing with other vehicle functions or may be a dedicated control unit dedicated to controlling the lighting devices 1-5. The control unit 14 receives one or more operating parameters 16 that can be set separately by the driver. In addition, the control unit 14 receives a general operating mode 18 that can be selected by the driver. The one or more operating parameters 16 can be selectively set by the driver and can act on the general operating mode 18 that is selected by the driver. The control unit 14 processes the one or more input operating parameters 16 and the generally operating mode 18 and controls the ambient lighting devices 1-5 in such a way that their intensity and color indicate to the driver whether the current setting of the separately settable operating parameter(s) 16 has a positive or negative effect on the general operating mode 18 selected by the driver.

Figure 3:
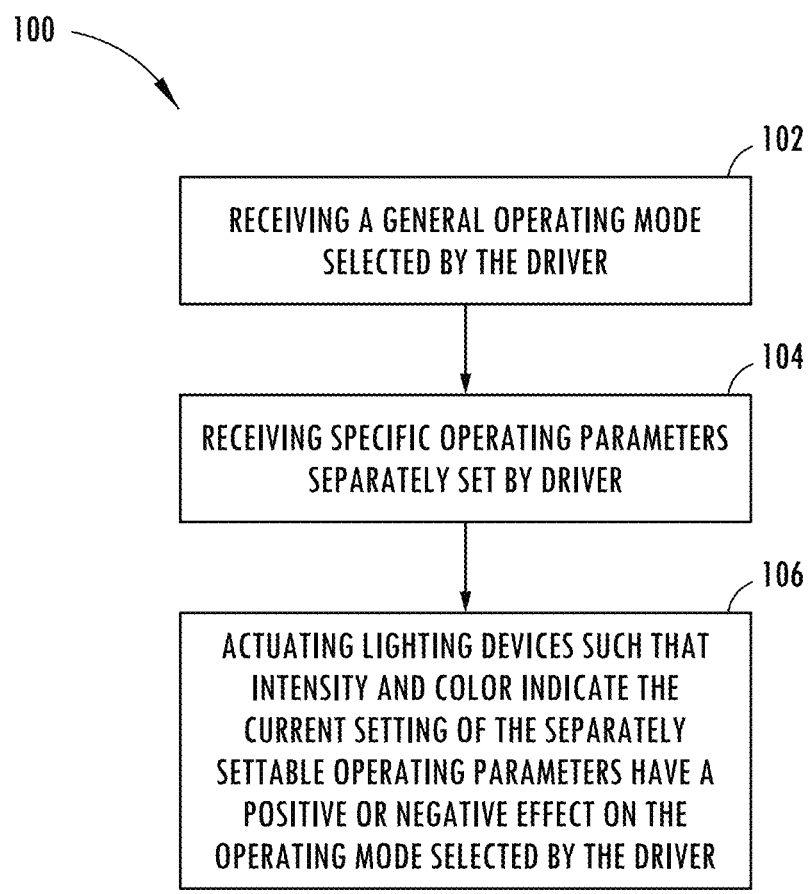
FIG. 3 is a flow chart illustrating a method for illuminating the passenger compartment with ambient lights, according to one embodiment.

Referring to FIG. 3, a method for illuminating a passenger compartment with the ambient lighting devices 1-5 is illustrated, according to one embodiment. The method 100 includes step 102 of receiving a general operating mode selected by the driver, and step 104 of receiving one or more specific operating parameters. Next, method 100 actuates the one or more of the ambient lighting devices such that the intensity and color indicate the current setting of the separately settable operating parameter has a positive or negative effect on the general operating mode selected by the driver. It should be appreciated that the method 100 may be executed by the control unit 14.

According to one embodiment, lighting devices which are spatially assigned to various areas of the passenger compartment of a vehicle in which there is respectively a vehicle component with an operating parameter which can be set separately by the driver and which can act on a general operating mode selected by the driver and which is aimed at a specific general type of driving, are not all actuated together but rather independently of one another and, if appropriate, differently, specifically in such a way that their intensity and color indicate to the driver whether the current setting of the separately settable operating parameter has a positive or negative effect on the general operating mode selected by the driver.

The spatial assignment provides the driver with intuitively perceptible optical messages as to which current operating parameters the driver can change in order to achieve even better the target of the general operating mode selected by the driver. For this purpose, the driver does not even have to avert his or her gaze from the road, since the message is provided through a corresponding spatial part of the ambient lighting and can be perceived through a specific spatial variable, even in the corner of his or her eye. Nevertheless, the driver is hardly disturbed or distracted by this since ambient lights are relatively subtle.

If, for example, the driver has selected in an energy saving mode or fuel saving mode, an air quality mode or an air conditioning mode, but has not considered the fact that a side window is still open, which is not beneficial to the selected operating mode, he can easily perceive ambient lighting in a warning color such as red in the region of this side window, particularly if the rest of the ambient lighting is in a contrasting color such as, for example, green, indicating that otherwise all other operating parameters are set in an optimum way. The driver can then easily recognize from this that the driver merely has to close the window in order to achieve in an optimum way the general operating state which is desired by the driver.

In this context, the intensity or color of the area which is lit up in a warning fashion can also be used to indicate the intensity of the influence of the assigned operating parameter on the desired general operating state. For example, a window which has been left half open can be indicated by orange color ambient lighting in this area instead of by red color ambient lighting, and in the case of a window which is closed to an even greater extent the ambient lighting would increasingly become green or blue color in this example.

In one embodiment, when the positions, colors and intensities of the distributed ambient lights are selected, all the operating parameters which can influence the general operating mode selected by the driver are taken into account and their effects are displayed by means of the distributed ambient lights. In contrast to the prior art, no actual state is thus displayed, nor is the perception thereof compensated, but instead it is made clear to the driver which driving-state-dependent operating parameters can have a positive influence on the desired target operating state and, if appropriate, can be adjusted to a better setting.

Within the scope of the method according to one embodiment, it is preferably determined to what extent the current setting value of each separately settable operating parameter has a positive or negative effect on the general operating mode selected by the driver in that an associated general operating mode index is formed from current measured setting values of all the corresponding operating parameters which are influenced by a vehicle occupant, the index constituting a measure of the degree to which the optimum of the selected general operating mode is reached at a particular time, being the intensity and color of each local lighting device set as a function of the portion of the general operating mode index formed by the associated operating parameter.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A method for illuminating a passenger compartment of a vehicle comprising:
   automatically setting intensity and color of ambient light emitted by lighting devices as a function of specific operating parameters which are influenced by a vehicle occupant, wherein the lighting devices are distributed and respectively spatially assigned to an area of the passenger compartment of the vehicle in which there is a vehicle component with an operating parameter which can be set separately by the driver and which can act on a general operating mode selected by the driver, and wherein the lighting devices are actuated such that the intensity and color indicate to the driver whether the current setting of the separately settable operating parameter has a positive or negative effect on the general operating mode selected by the driver, wherein the general operating mode is one of an energy saving mode or fuel saving mode, a sporty mode for sporty driving, an air quality mode for good air quality in the passenger compartment of the vehicle, and an air conditioning mode for the highest possible effectiveness of the air conditioning system, and wherein it is determined to what extent the current setting value of each separately settable operating parameter has a positive or negative effect on the general operating mode selected by the driver in that an associated general operating mode index is formed from current measured setting values of all the corresponding operating parameters which are influenced by a vehicle occupant, the index constituting a measure of the degree to which an optimum of the selected general operating mode is reached at a particular time, the intensity and color of each local lighting device being set as a function of the proportion of the general operating mode index formed by the associated operating parameter.

2. The method of claim 1, wherein the lighting devices each contain one or more diffuse and/or indirect light sources.

3. A motor vehicle comprising:
   a plurality of passenger compartment ambient lighting devices;
   an operating parameter input for receiving one or more driver-selected operating parameters;
   a general operating mode input for receiving a driver-selected general operating mode; and
   a control unit automatically actuating the lighting devices so that intensity and color indicate whether the current setting of a separately settable operating parameter has a positive or negative effect on the general operating mode, wherein the lighting devices are respectively spatially assigned to a specific area of the passenger compartment of the vehicle in which there is a vehicle component with an operating parameter, wherein the general operating mode is one of an energy saving mode or fuel saving mode, a sporty mode for sporty driving, an air quality mode for food air quality in the passenger compartment of the vehicle, and an air conditioning mode for the highest possible effectiveness of the air conditioning system, and wherein it is determined to what extent the current setting value of each separately settable operating parameter has a positive or negative effect on the general operating mode selected by the driver in that an associated general operating mode index is formed from current measured setting values of ail the corresponding operating parameters which are influenced by a vehicle occupant, the index constituting a measure of the degree to which an optimum of the selected general operating mode is reached at a particular time, the intensity and color of each local lighting device being set as a function of the proportion of the general operating mode index formed by the associated operating parameter.

4. The vehicle of claim 3, wherein the lighting devices each contain one or more diffuse and/or indirect light sources.

\* \* \* \* \*

UNITED STATES PATENT AND TRADEMARK OFFICE
CERTIFICATE OF CORRECTION

PATENT NO. : 10,259,388 B2  
APPLICATION NO. : 15/788150  
DATED : April 16, 2019  
INVENTOR(S) : Mathissen et al.

Page 1 of 1

It is certified that error appears in the above-identified patent and that said Letters Patent is hereby corrected as shown below:

In the Claims

Column 6  
Claim 3, Line 53:  
"food" should read --good--.  
Claim 3, Line 62:  
"ail" should read --all--.

Signed and Sealed this  
Second Day of July, 2019

Andrei Iancu  
*Director of the United States Patent and Trademark Office*